United States Patent
Li et al.

(10) Patent No.: US 10,396,381 B2
(45) Date of Patent: Aug. 27, 2019

(54) THERMOELECTRIC COOPERATION CONTROL METHOD FOR SOFC SYSTEM BASED ON FRACTIONAL ORDER SLIDING MODE VARIABLE STRUCTURE

(71) Applicant: HUAZHONG UNIVERSITY OF SCIENCE AND TECHNOLOGY, Hubei (CN)

(72) Inventors: Xi Li, Hubei (CN); Jianhua Jiang, Hubei (CN); Zhonghua Deng, Hubei (CN); Lin Zhang, Hubei (CN); Jian Li, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 348 days.

(21) Appl. No.: 15/312,056

(22) PCT Filed: Jun. 3, 2016

(86) PCT No.: PCT/CN2016/084663
§ 371 (c)(1),
(2) Date: Nov. 17, 2016

(87) PCT Pub. No.: WO2017/156888
PCT Pub. Date: Sep. 21, 2017

(65) Prior Publication Data
US 2018/0131021 A1 May 10, 2018

(30) Foreign Application Priority Data
Mar. 16, 2016 (CN) .......................... 2016 1 0150888

(51) Int. Cl.
*H01M 8/04992* (2016.01)
*H01M 8/043* (2016.01)
(Continued)

(52) U.S. Cl.
CPC ..... *H01M 8/04992* (2013.01); *H01M 8/0432* (2013.01); *H01M 8/0494* (2013.01);
(Continued)

(58) Field of Classification Search
CPC .......... H01M 8/04992; H01M 8/0432; H01M 8/04753; H01M 8/0494; H01M 8/04589; H01M 2008/1293; G05B 11/01
See application file for complete search history.

(56) References Cited

U.S. PATENT DOCUMENTS

2016/0210858 A1 9/2016 Warrier et al.

FOREIGN PATENT DOCUMENTS

| CN | 103969593 A | 8/2014 |
|----|-------------|--------|
| CN | 104009247 A | 8/2014 |
| CN | 105304920 A | 2/2016 |

OTHER PUBLICATIONS

Li et al. (CN104009247A, English machine translation) (Year: 2014).*

* cited by examiner

*Primary Examiner* — Susan D Leong
(74) *Attorney, Agent, or Firm* — Scully, Scott, Murphy & Presser, P.C.

(57) ABSTRACT

The present invention provides a thermoelectric cooperative control method for the SOFC system based on fractional order sliding mode variable structure, comprising the following steps: S1, collecting parameters of system states and output under combinations of different input parameters of the SOFC system, acquiring an influence function of steady-state power, temperature, efficiency response characteristics and bypass valve opening BP within a full load interval on efficiency optimization, as well as an efficiency optimization function within a specified load switching interval and under a time-delay condition; S2, acquiring a local optimal steady- (Continued)

state operation function, a global optimal function under the steady state developed and formed, and a power tracking function with different switching intervals and different time-delay conditions; S3, calculating a sliding mode interval; S4, calculating a series reaching law function according to optimization functions; S5, eliminating chattering of the series reaching law function through a fractional order optimization method, and solving the reaching law by calculation. The present method can provide precise, flexible and stable control, greatly speed up the switch process, overcome time-delay feature of the great inertia of the SOFC system, and realize fast load switching.

8 Claims, 1 Drawing Sheet

(51) Int. Cl.
| | | |
|---|---|---|
| *H01M 8/04828* | (2016.01) | |
| *H01M 8/0432* | (2016.01) | |
| *H01M 8/04746* | (2016.01) | |
| *G05B 11/01* | (2006.01) | |
| *H01M 8/04537* | (2016.01) | |
| *H01M 8/124* | (2016.01) | |

(52) U.S. Cl.
CPC ......... *H01M 8/04753* (2013.01); *G05B 11/01* (2013.01); *H01M 8/04589* (2013.01); *H01M 2008/1293* (2013.01)

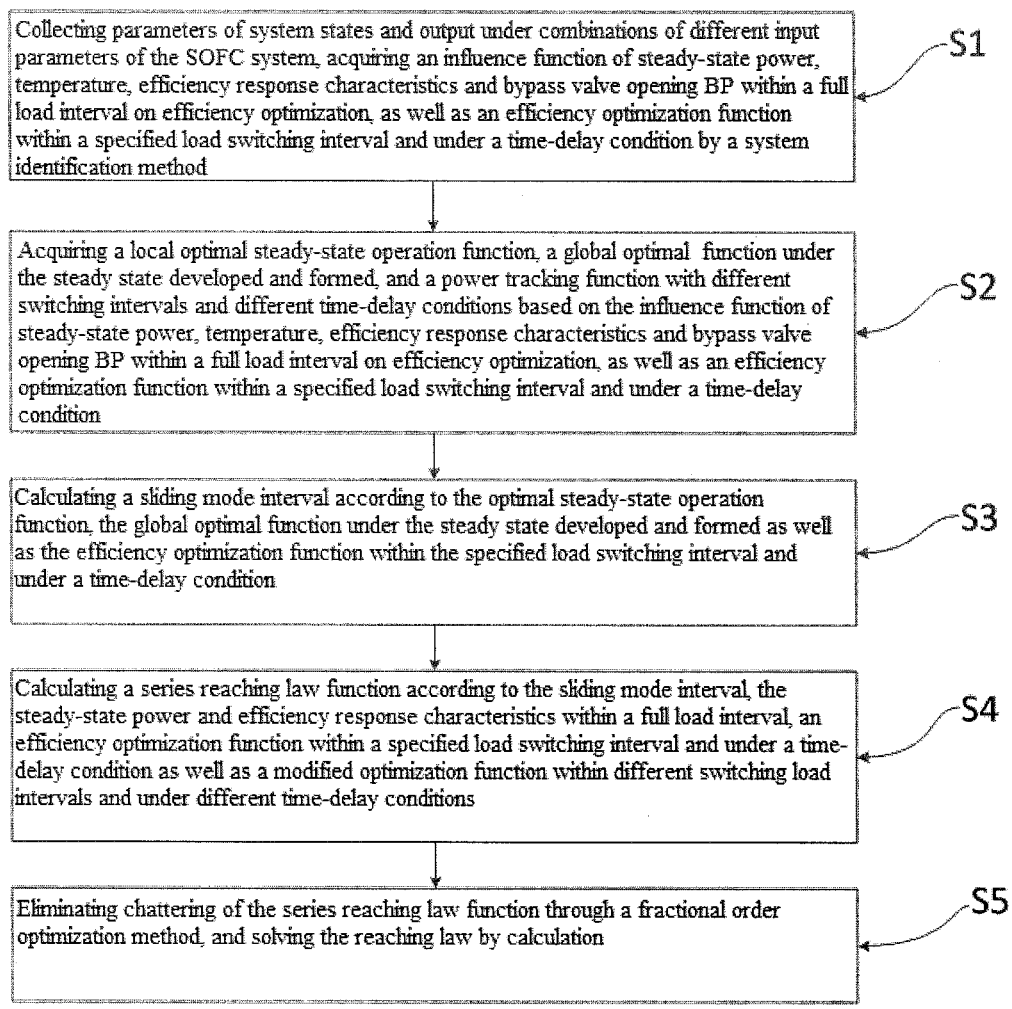

THERMOELECTRIC COOPERATION CONTROL METHOD FOR SOFC SYSTEM BASED ON FRACTIONAL ORDER SLIDING MODE VARIABLE STRUCTURE

TECHNICAL FIELD

The present invention relates to a thermoelectric cooperative control method for a SOFC system based on fractional order sliding mode variable structure.

BACKGROUND TECHNIQUE

A fuel cell is a device which converts chemical energy released during the process in which hydrogen reacts with oxygen to produce water, into electrical energy. The basic principle is equivalent to a reverse reaction of an electrolysis reaction. Fuels ($H_2$ and CO etc.) and an oxidant ($O_2$) are ionized into ions on a cathode and an anode of the cell by means of action of the oxidant, and forms a voltage between the negative electrode and the positive electrode by virtue of transfer ability of the ions between the electrodes through dielectric between these two electrodes. When a circuit is formed by the electrodes and an external load, it is possible to supply power outwardly.

There are many types of fuel cells, according to different applied electrolytes, mainly including a phosphoric acid fuel cell (PAFC), a molten carbonate fuel cell (MCFC), a solid oxide fuel cell (SOFC) and a proton exchange membrane fuel cell (PEMFC) and the like.

The fuel cell has advantages such as non-pollution, high efficiency, wide application, noise-free and continuous operation. Its power generation efficiency can reach equal to or more than 40%, and the efficiency of co-generation of heat and power also can be equal to or more than 80%. Most of the fuel cells are in the stage of research and development, although the technology like the phosphoric acid fuel cell (PAFC) is matured and already available on the market, they are still rather expensive. In view of the unique advantages of the fuel cells, they will certainly play an increasingly important role in the future gas heating industry with the advancement of commercialization process related to this technology.

SUMMARY OF THE INVENTION

The technical problem to be solved by the present invention is to provide a thermoelectric cooperative control method for a SOFC system based on fractional order sliding mode variable structure which can provide precise, flexible and stable control, greatly speed up the switch process, overcome time-delay feature of the great inertia of the SOFC system, and realize fast load switching.

The present invention solves the above problems with the following technical solution: a thermoelectric cooperative control method for the SOFC system based on fractional order sliding mode variable structure, comprising the following steps:

S1. Collecting parameters of system states and output under combinations of different input parameters of the SOFC system, acquiring an influence function of steady-state power, temperature, efficiency response characteristics and bypass valve opening BP within a full load interval on efficiency optimization, as well as an efficiency optimization function within a specified load switching interval and under a time-delay condition by a system identification method;

S2. Acquiring a local optimal steady-state operation function, a global optimal function under the steady state developed and formed, and a power tracking function with different switching intervals and different time-delay conditions based on the influence function of steady-state power, temperature, efficiency response characteristics and bypass valve opening BP within a full load interval, as well as an efficiency optimization function within a specified load switching interval and under a time-delay condition;

S3. Calculating a sliding mode interval according to the optimal steady-state operation function, the global optimal function under the steady state developed and formed as well as the efficiency optimization function within the specified load switching interval and under a time-delay condition;

S4. Calculating a reaching law function according to the sliding mode interval, the steady-state power and efficiency response characteristics within a full load interval, an efficiency optimization function within a specified load switching interval and under a time-delay condition as well as a modified optimization function within different switching load intervals and under different time-delay conditions;

S5. Eliminating chattering of the reaching law function through a fractional order optimization method, and solving the reaching law by calculation.

A fuel utilization rate, FU is a key indicator recognized within the industry, affecting the power generation efficiency of the system, and it is desired according to current researches to maximize the fuel utilization rate in order to improve the efficiency of the system; an excess air ratio, AR is an expression of a direct relationship between input air and air flow participating in the reaction, which helps to realize cooperative action in system control analysis.

In addition, load-oriented tracking is performed. The beneficial effects of the present invention are that, optimal operating points (Is, BP, AR, FU) can be achieved quickly with respect to the requirement of steady-state output of different power such that they meet the load demand on the premise that the security of the thermal characteristics of the system is guaranteed, and a maximum efficiency of the system can be realized under the required power output.

In the design of the load-oriented tracking whole-process observer, a comprehensive matching analysis of the response rate is further conducted, and an observer for internal temperature of the stack is designed to meet the requirement by the whole process of power generation of the system, in order to improve the precision and stability of static and dynamic state control strategy and overall control framework.

With mapping into the fractional order sliding model variable structure SOFC thermoelectric management-control framework, this optimization steady-state operation strategy set can develop the target sliding model surface into the sliding model interval, so as to provide greater flexibility and quality assurance to the design of the reaching law (that is, dynamic switching strategy) with the goal of arriving at the sliding model surface safely, quickly and with low chattering, on the premise of considering time delay of different gases.

During the power tracking, it needs some period for the process that temperature of the system is changed due to change of the power to show up, therefore, the goal of temperature constraining management and control can be realized by applying a control variable which can inhibit temperature change caused by power fluctuations at the same time of performing a fast power tracking. The optimization operation set (Is, BP, AR, FU) obtained by the present project can inhibit of temperature constraining under a specific power when ensuring efficiency optimization; Meanwhile, a combination switching strategy including two stages to be adopted will greatly speed up the switch process, overcome time-delay feature of the great inertia of the SOFC system, and realize fast load switching.

Further, in the step S1, a distribution parameter of internal temperature of a stack is acquired through running a distributed nodes model of the stack.

A further advantage from adopting the above mentioned method is that, based on a known observation method of the internal temperature gradient of the stack under a specified steady state, a decomposition of two layers of thermoelectric characteristics response time scale and gas-solid thermal characteristics response time scale is performed, and a real-time observation of temperature gradient in the whole process of load tracking is achieved, so as to ensure in principle a physical realizability of the static and dynamic state control strategy and control framework of the fractional order sliding model variable structure. In the design of the load-oriented tracking whole-process observer, a comprehensive matching analysis of the response rate is further conducted, in order to improve the precision and stability of the static and dynamic state control strategy and overall control framework.

Further, the dimensionality of the electrical pile is one dimension.

A further advantage from adopting the above mentioned method is that, the aim of one-dimensionalization is to simplify the actual stack model, this simplification process ensures that the required parameters are accurate, for example internal temperature of the stack, temperature gradient, and so on.

Further, a method for determining the local optimal stale-state operation function in Step 1, comprises the following steps:

Fixing working currents Is and the bypass valve opening BP and acquiring a plot of output performance with a fuel utilization rate FU as the horizontal axis and an excess air ratio AR as the vertical axis;

For the plot of output performance, fixing the working currents Is and acquiring a plot of output performance with a fuel utilization rate as the horizontal axis and the excess air ratio AR as the vertical axis under different bypass valve openings;

Traversing the values of different working currents and acquiring the system output performance under any of operating points (Is, BP, AR, FU);

Performing load-oriented tracking, and with respect to the requirement of steady-state output of any power, determining an optimal steady-state operation function corresponding to the requirement;

A further advantage from adopting the above mentioned method is that, since in the actual physical realization process of the system, the thermoelectric characteristics including temperature, power, efficiency are directly related to the current, a steady-state and dynamic-state analysis based on models in the present invention will be performed based on a current analysis mode respectively. With respect to the requirement of SOFC thermoelectric management and control, in order to achieve a real-time adjustment of the internal temperature of the stack, it is necessary to induce excess air; in order to meet the requirement of real-time tracking of load, it is needed to adjust the fuel utilization rate; in order to adjust the internal temperature of the stack quickly, and optimize the control of power generation of the system, it is necessary to real-time adjust the input amount of the bypass cold air, i.e. to adjust the bypass valve opening BP. A fuel utilization rate, FU is a key indicator recognized within the industry, affecting the power generation efficiency of the system, and it is desired according to current reaches to maximize the fuel utilization rate in order to improve the efficiency of the system; an excess air ratio, AR is an expression of a direct relationship between input air and air flow participating in the reaction, which helps to realize cooperative action in system control analysis. A current control mode is adopted by the present invention, and the excess air ratio (AR), fuel utilization rate (FU), bypass valve opening (BP), currents (Is) are selected as a combination of regulating variables.

Further, the distribution parameter of internal temperature of the stack in the step S1 is acquired through an observer of internal temperature gradient of the stack, the construction of the observer of internal temperature gradient of the stack comprises the following steps:

Establishing a linearized state-space equation and designing a reduced order Luenberger observer;

Assume an electrochemical reaction is completed instantaneously, after the quasi-static hypothesis, the model is like:

$$\begin{cases} \dfrac{dx_1}{dt} = f_1(x_1, y, u, w) \\ \dfrac{dy}{dt} = f_2(x_1, y, u, w) \end{cases} \quad (1)$$

wherein $[(x_1)^T \ y^T]^T = [T_{air}^1 \ T_{sol}^1 \ T_{air}^2 \ T_{sol}^2 \ \ldots \ T_{air}^5 \ T_{sol}^5]^T$, x1 is the solid-layer and air-layer temperature of the first four nodes, y is the solid-layer and air-layer temperature of the fifth node;

$$u = [F_{ca}^{in} F_{an}^{in}]^T, \ w = I_{tot},$$

for the above model, the observer is designed in the following form:

$$\begin{cases} \dfrac{d\hat{x}_1}{dt} = f_1(\hat{x}_1, \hat{y}, u, w) + Lv \\ \dfrac{d\hat{y}}{dt} = f_2(\hat{x}_1, \hat{y}, u, w) - v \end{cases} \quad (2)$$

wherein $\hat{x}_1$ and $\hat{y}$ are the estimate of $x_1$ and y respectively; L Is the gain to be determined, v is the error between the estimated value and the actual value, $v = \hat{y} - y$, u is the input fuel flow rate of the anode and cathode, W is the output current of the stack;

in order to solve the gain L, firstly, the model is linearized into the following form:

$$\begin{cases} \dfrac{dx_1}{dt} = A_{11}x_1 + A_{12}y + B_1u + C_1w \\ \dfrac{dy}{dt} = A_{21}x_1 + A_{22}y + B_2u + C_2w \end{cases} \quad (3)$$

Compared with non-linear model, the accuracy of the linearized model is verified. Then according to the characteristics of SOFC that there is a big difference of response rate of heat transfer between gas and solid, the model is decomposed as follows:

heat transfer model of gas:

$$\begin{cases} \dfrac{dx_{air}^1}{dt} = A_{air}^{11}x_1 + A_{air}^{12}y + B_{air}^1 u_{air} + C_{air}^1 w \\ \dfrac{dy_{air}}{dt} = A_{air}^{21}x_1 + A_{air}^{22}y + B_{air}^2 u_{air} + C_{air}^2 w \end{cases} \quad (4)$$

heat transfer model of solid:

$$\begin{cases} \dfrac{dx_{sol}^1}{dt} = A_{sol}^{11}x_1 + A_{sol}^{12}y + B_{sol}^1 u_{sol} + C_{sol}^1 w \\ \dfrac{dy_{sol}}{dt} = A_{sol}^{21}x_1 + A_{sol}^{22}y + B_{sol}^2 u_{sol} + C_{sol}^2 w \end{cases} \quad (5)$$

With respect to the above heat transfer model of gas and solid, observers are designed by using the linear theory, and each corresponding observer gain $L_1$ and $L_2$ are solved respectively.

$$L = \begin{bmatrix} L_1(1,1) & 0 & L_1(2,1) & 0 & L_1(3,1) & 0 & L_1(4,1) & 0 \\ 0 & L_2(1,1) & 0 & L_2(2,1) & 0 & L_2(3,1) & 0 & L_2(4,1) \end{bmatrix}^T \quad (6)$$

wherein:

$[\, L_1(1,1) \quad L_1(2,1) \quad L_1(3,1) \quad L_1(4,1) \,]^T = L_1$ $[\, L_2(1,1) \quad L_2(2,1) \quad L_2(3,1) \quad L_2(4,1) \,]^T = L_2.$ A further advantage from adopting the above mentioned method is that, the electric characteristics of SOFC depends on the electrochemical reaction, and the response rate is on the time scale of milliseconds; the thermal characteristics of SOFC depends on the heat transfer between the stacks, and the response rate is on the time scale of seconds or even minutes. In addition, there is also a difference on the order of magnitude of time between the heat transfer rates of gas and solid, in virtue of the difference between heat transfer coefficients of gas and solid.

It is necessary to perform optimization of the design of the observer which matches the time scale during the process of load tracking, on basis of a known design method of internal observer of the stack, with respect to the switching strategy in change of different loads. According to the "all observable minimum dimensional state space" method, a low-cost fast and high-precision selection solution of observational variables $[F_{air}^{in}, F_{fuel}^{in}, T_{air}^5, T_{sol}^5]$ can be determined, and then based on the combination of variables, in order to further meet the requirement of fast observations of temperature distribution of the stack in the whole process of load tracking, a reduced order Luenberger observer is intended to be designed based on a linearized state-space equation.

Compared with solving L by directly using the pole assignment of the system, this construction method can effectively avoid difference in the order of magnitudes of the response rate of heat transfer of gas and solid; and said method can be extended and performed at different operating points, and an observer at said operating point is obtained.

Further, in step S4, the specific method used for calculating the series reaching law function is:

Acquiring a global series optimal sliding model surface according to the efficiency optimization function;

Determining the reaching law function according to the power, temperature and efficiency characteristics of the power interval between different sliding model surfaces;

Reducing chattering by determining the order of fractional order of the reaching law function according to optimal switching function of the power;

Solving the reaching law by using an improved calculation method of constant weight, and acquiring a system input parameter during the power tracking switching system.

The global optimal function is obtained by the local optimal steady-state operation function through traversing values of different currents, i.e. the global optimal function is formed by the local optimal steady-state operation function corresponding to each current.

A further advantage from adopting the above mentioned method is that, output parameters of the SOFC system under all allowed input parameters can be obtained by this method, making it convenient to calculate the sliding interval.

Further, the parameters of system states and output under combinations of different input parameters of the SOFC system includes: the distribution parameter of internal temperature of the stack, system efficiency, and system power.

A further advantage from adopting the above mentioned method is that, safe operation of the SOFC system must guarantee a uniform distribution of the internal temperature of the stack, which also doesn't exceed the constrained temperature, a greater temperature gradient or higher temperature will cause serious and irreversible damage to the SOFC stack, and impact lift-time and security of operation of the SOFC system. In order to enable safe, efficient and long-time operation of the SOFC system, less fuel is consumed while the power output and internal temperature parameter requirement are guaranteed, through fractional order sliding mode variable structure, and thus the goal of high-efficiency operation is achieved.

BRIEF DESCRIPTION OF THE DRAWINGS

FIG. 1 is a flow diagram of the present invention.

DESCRIPTION OF THE EMBODIMENTS

With reference to the following drawings, the principles and features of the present invention will be described, and cited examples only serve to illustrate the invention and are not intended to limit the scope of the invention.

As shown in FIG. 1, the thermoelectric cooperative control method for the SOFC system based on fractional order sliding mode variable structure, comprises the following steps:

S1. Collecting parameters of system states and output under combinations of different input parameters of the SOFC system, acquiring an influence function of steady-state power, temperature, efficiency response characteristics and bypass valve opening BP within a full load interval on efficiency optimization, as well as an efficiency optimization function within a specified load switching interval and under a time-delay condition by a system identification method;

S2. Acquiring a local optimal steady-state operation function, a global optimization function under the steady state developed and formed, and a power tracking function with different switching intervals and different time-delay conditions based on the influence function of steady-state power, temperature, efficiency response characteristics and bypass valve opening BP within a full load interval on efficiency optimization, as well as an efficiency optimization function within a specified load switching interval and under a time-delay condition;

S3. Calculating a sliding mode interval according to the optimal steady-state operation function, the global optimization function under the steady state developed and formed as well as the efficiency optimization function within the specified load switching interval and under a time-delay condition;

S4. Calculating a series reaching law function according to the sliding mode interval, the steady-state power and efficiency response characteristics within a full load interval, an efficiency optimization function within a specified load switching interval and under a time-delay condition as well as an modified optimization function within different switching load intervals and under different time-delay conditions;

S5. Eliminating chattering of the series reaching law function through a fractional order optimization method, and solving the reaching law by calculation.

In the step S1, a distribution parameter of internal temperature of a stack is acquired through running a distributed nodes model of the stack.

The dimensionality of the electrical pile is one dimension.

The method for obtaining temperature distribution can be understood as: in the established stack model, actually the stack is divided into five nodes, i.e. so called distributed model, in which each node has a temperature parameter, and temperature of respective node can be obtained by running this model. This is a set of temperature parameters, which can reflect the internal temperature distribution of the stack.

A method for determining the local optimal stale-state operation function in Step 1, comprises the following steps:

Fixing working currents Is and the bypass valve opening BP and acquiring a plot of output performance with a fuel utilization rate FU as the horizontal axis and an excess air ratio AR as the vertical axis;

For the plot of output performance, fixing the working currents Is and acquiring a plot of output performance with a fuel utilization rate as the horizontal axis and the excess air ratio AR as the vertical axis under different bypass valve openings; Traversing the values of different working currents and acquiring the system output performance under any of operating points (Is, BP, AR, FU);

Performing load-oriented tracking, and with respect to the requirement of steady-state output of any power, determining an optimal steady-state operation function corresponding to the requirement;

The distribution parameter of internal temperature of the stack in the step S1 is acquired through an observer of internal temperature gradient of the stack, the construction of the observer of internal temperature gradient of the stack comprises the following steps:

Establishing a linearized state-space equation and designing a reduced order Luenberger observer;

Assume an electrochemical reaction is completed instantaneously, after the quasi-static hypothesis, the model is like:

$$\begin{cases} \dfrac{dx_1}{dt} = f_1(x_1, y, u, w) \\ \dfrac{dy}{dt} = f_2(x_1, y, u, w) \end{cases} \quad (1)$$

wherein $[(x_1)^T \; y^T]^T = [T_{air}^1 \; T_{sol}^1 \; T_{air}^2 \; T_{sol}^2 \; \ldots \; T_{air}^5 \; T_{sol}^5]^T$, x1 is the solid-layer and air-layer temperature of the first four nodes, y is the solid-layer and air-layer temperature of the fifth node;

$u = [F_{ca}^{in} F_{an}^{in}]^T$, $w = I_{tot}$, for the above model, the observer is designed in the following form:

$$\begin{cases} \dfrac{d\hat{x}_1}{dt} = f_1(\hat{x}_1, \hat{y}, u, w) + Lv \\ \dfrac{d\hat{y}}{dt} = f_2(\hat{x}_1, \hat{y}, u, w) - v \end{cases} \quad (2)$$

wherein $\hat{x}_1$ and $\hat{y}$ are the estimate of $x_1$ and y respectively; L is the gain to be determined, v is the error between the estimated value and the actual value, $v = \hat{y} - y$, u is the input fuel flow rate of the anode and cathode, W is the output current of the stack;

In order to solve the gain L, firstly, the model is linearized into the following form:

$$\begin{cases} \dfrac{dx_1}{dt} = A_{11}x_1 + A_{12}y + B_1 u + C_1 w \\ \dfrac{dy}{dt} = A_{21}x_1 + A_{22}y + B_2 u + C_2 w \end{cases} \quad (3)$$

Compared with non-linear model, the accuracy of the linearized model is verified.

Then according to the characteristics of SOFC that there is a big difference of response rate of heat transfer between gas and solid, the model is decomposed as follows:

heat transfer model of gas:

$$\begin{cases} \dfrac{dx_{air}^1}{dt} = A_{air}^{11} x_1 + A_{air}^{12} y + B_{air}^1 u_{air} + C_{air}^1 w \\ \dfrac{dy_{air}}{dt} = A_{air}^{21} x_1 + A_{air}^{22} y + B_{air}^2 u_{air} + C_{air}^2 w \end{cases} \quad (4)$$

heat transfer model of solid:

$$\begin{cases} \dfrac{dx_{sol}^1}{dt} = A_{sol}^{11} x_1 + A_{sol}^{12} y + B_{sol}^1 u_{sol} + C_{sol}^1 w \\ \dfrac{dy_{sol}}{dt} = A_{sol}^{21} x_1 + A_{sol}^{22} y + B_{sol}^2 u_{sol} + C_{sol}^2 w \end{cases} \quad (5)$$

With respect to the above heat transfer model of gas and solid, observers are designed by using the linear theory, and each corresponding observer gain $L_1$ and $L_2$ are solved respectively. Then, the following method are used to construct nonlinear observer gain matrix L:

$$L = \begin{bmatrix} L_1(1,1) & 0 & L_1(2,1) & 0 & L_1(3,1) & 0 & L_1(4,1) & 0 \\ 0 & L_2(1,1) & 0 & L_2(2,1) & 0 & L_2(3,1) & 0 & L_2(4,1) \end{bmatrix}^T \quad (6)$$

wherein $[L_1(1,1) \quad L_1(2,1) \quad L_1(3,1) \quad L_1(4,1)]^T = L_1$ $[L_2(1,1) \quad L_2(2,1) \quad L_2(3,1) \quad L_2(4,1)]^T = L_2$.

In step S4, the specific method used for calculating the series reaching law function is:

Acquiring a global series optimal sliding model surface according to the efficiency optimization function;

Determining the reaching law function according to the power, temperature and efficiency characteristics of the power interval between different sliding model surfaces;

Reducing chattering by determining the order of fractional order of the reaching law function according to optimal switching function of the power;

Solving the reaching law by using an improved calculation method of constant weight, and acquiring a system input parameter during the power tracking switching system.

The global optimal function is obtained by the local optimal steady-state operation function through traversing values of different currents, i.e. the global optimal function is formed by the local optimal steady-state operation function corresponding to each current.

The parameters of system states and output under combinations of different input parameters of the SOFC system includes: the distribution parameter of internal temperature of the stack, system efficiency, and system power.

The foregoing are only preferred embodiments of the present invention, which are not intended to limit the present invention, any modifications, substitution to same object and improvement made within the spirit and principles of the present invention, should be included within the protection scope of the present invention.

What is claimed that:

1. A thermoelectric cooperative control method for a SOFC (solid oxide fuel cell) system based on fractional order sliding mode variable structure, comprising the following steps:
   S1. Collecting parameters of system states and output under combinations of different input parameters of the SOFC system, acquiring an influence function of steady-state power, temperature, efficiency response characteristics and bypass valve opening BP within a full load interval on efficiency optimization, as well as an efficiency optimization function within a specified load switching interval and under a time-delay condition by a system identification method;
   S2. Acquiring a local optimal steady-state operation function, a global optimal function under the steady state developed and formed, and a power tracking function with different switching intervals and different time-delay conditions based on the influence function of steady-state power, temperature, efficiency response characteristics and bypass valve opening BP within a full load interval on efficiency optimization, as well as an efficiency optimization function within a specified load switching interval and under a time-delay condition;
   S3. Calculating a sliding mode interval according to the optimal steady-state operation function, the global optimal function under the steady state developed and formed as well as the efficiency optimization function within the specified load switching interval and under a time-delay condition;
   S4. Calculating a series reaching law function according to the sliding mode interval, the steady-state power and efficiency response characteristics within a full load interval, an efficiency optimization function within a specified load switching interval and under a time-delay condition as well as a modified optimization function within different switching load intervals and under different time-delay conditions;
   S5. Eliminating chattering of the series reaching law function through a fractional order optimization method, and solving the reaching law by calculation.

2. The thermoelectric cooperative control method for the SOFC system based on fractional order sliding mode variable structure as described in claim 1, wherein, in the step S1, a distribution parameter of internal temperature of a stack is acquired through running a distributed nodes model of the stack.

3. The thermoelectric cooperative control method for the SOFC system based on fractional order sliding mode variable structure as described in claim 2, wherein, the stack has one dimension.

4. The thermoelectric cooperative control method for the SOFC system based on fractional order sliding mode variable structure as described in claim 1, wherein, a method for determining the local optimal steady-state operation function in Step 2, comprises the following steps:
   Fixing working currents Is and the bypass valve opening BP and acquiring a plot of output performance with a fuel utilization rate FU as the horizontal axis and a excess air ratio AR as the vertical axis;
   For the plot of output performance, fixing the working currents Is and acquiring a plot of output performance with a fuel utilization rate as the horizontal axis and the excess air ratio AR as the vertical axis under different bypass valve openings;
   Traversing the values of different working currents and acquiring the system output performance under any of operating points (Is, BP, AR, FU);
   Performing load-oriented tracking, and determining the optimal steady-state operation function under a required power output.

5. The thermoelectric cooperative control method for the SOFC system based on fractional order sliding mode variable structure as described in claim 2, wherein, the distribution parameter of internal temperature of the stack in the step S1 is acquired through an observer of internal temperature gradient of the stack, the construction of the observer of internal temperature gradient of the stack comprises the following steps:
   Establishing a linearized state-space equation and designing a reduced order Luenberger observer;
   when it is determined that an electrochemical reaction is completed instantaneously, after the quasi-static hypothesis, the model is:

$$\begin{cases} \dfrac{dx_1}{dt} = f_1(x_1, y, u, w) \\ \dfrac{dy}{dt} = f_2(x_1, y, u, w) \end{cases} \quad (1)$$

wherein $[(x_1)^T\ y^T]^T = [T_{air}^1\ T_{sol}^1\ T_{air}^2\ T_{sol}^2\ \ldots\ T_{air}^5\ T_{sol}^5]^T$, x1 is the solid-layer and air-layer temperature of the first four nodes, y is the solid-layer and air-layer temperature of the fifth node;

$u = [F_{ca}^{in} F_{an}^{in}]^T$, $w = I_{tot}$, for the above model, the observer is designed in the following form:

$$\begin{cases} \dfrac{d\hat{x}_1}{dt} = f_1(\hat{x}_1, \hat{y}, u, w) + Lv \\ \dfrac{d\hat{y}}{dt} = f_2(\hat{x}_1, \hat{y}, u, w) - v \end{cases} \quad (2)$$

wherein $\hat{x}_1$ and $\hat{y}$ are the estimate of $x_1$ and y respectively; L Is the gain to be determined, v is the error between the estimated value and the actual value, $v = \hat{y} - y$, u is the input fuel flow rate of the anode and cathode, W is the output current of the stack;

in order to solve the gain L, firstly, the model is linearized into the following form:

$$\begin{cases} \dfrac{dx_1}{dt} = A_{11}x_1 + A_{12}y + B_1u + C_1w \\ \dfrac{dy}{dt} = A_{21}x_1 + A_{22}y + B_2u + C_2w \end{cases} \quad (3)$$

Compared with non-linear model, the accuracy of the linearized model is verified, and then according to the characteristics of SOFC that there is a big difference of response rate of heat transfer between gas and solid, the model is decomposed as follows:

heat transfer model of gas:

$$\begin{cases} \dfrac{dx_{air}^1}{dt} = A_{air}^{11}x_1 + A_{air}^{12}y + B_{air}^1 u_{air} + C_{air}^1 w \\ \dfrac{dy_{air}}{dt} = A_{air}^{21}x_1 + A_{air}^{22}y + B_{air}^2 u_{air} + C_{air}^2 w \end{cases} \quad (4)$$

heat transfer model of solid:

$$\begin{cases} \dfrac{dx_{sol}^1}{dt} = A_{sol}^{11}x_1 + A_{sol}^{12}y + B_{sol}^1 u_{sol} + C_{sol}^1 w \\ \dfrac{dy_{sol}}{dt} = A_{sol}^{21}x_1 + A_{sol}^{22}y + B_{sol}^2 u_{sol} + C_{sol}^2 w \end{cases} \quad (5)$$

With respect to the above heat transfer model of gas and solid, observers are designed by using the linear theory, and each corresponding observer gain $L_1$ and $L_2$ are solved respectively, then the following method are used to construct nonlinear observer gain matrix: L:

$$L = \begin{bmatrix} L_1(1,1) & 0 & L_1(2,1) & 0 & L_1(3,1) & 0 & L_1(4,1) & 0 \\ 0 & L_2(1,1) & 0 & L_2(2,1) & 0 & L_2(3,1) & 0 & L_2(4,1) \end{bmatrix}^T \quad (6)$$

including:

$[L_1(1,1)L_1(2,1)L_1(3,1)L_1(4,1)]^T = L_1$ $[L_2(1,1)L_2(2,1)L_2(3,1)L_2(4,1)]^T = L_2$.

6. The thermoelectric cooperative control method for the SOFC system based on fractional order sliding mode variable structure as described in claim 1, wherein, in step S4, the specific method used for calculating the series reaching law function is:

Acquiring a global series optimal sliding model surface according to the efficiency optimization function;

Determining the reaching law function according to the power, temperature and efficiency characteristics of the power interval between different sliding model surfaces;

Reducing chattering by determining the order of fractional order of the reaching law function according to optimal switching function of the power;

Solving the reaching law by using an improved calculation method of constant weight, and acquiring a system input parameter during the power tracking switching system.

7. The thermoelectric cooperative control method for the SOFC system based on fractional order sliding mode variable structure as described in claim 1, wherein, the global optimal function is obtained by the local optimal steady-state operation function through traversing values of different currents.

8. The thermoelectric cooperative control method for the SOFC system based on fractional order sliding mode variable structure as described in claim 1, wherein, the parameters of system states and output under combinations of different input parameters of the SOFC system includes: the distribution parameter of internal temperature of the stack, system efficiency, and system power.

* * * * *